United States Patent
Liu et al.

(10) Patent No.: US 8,756,372 B2
(45) Date of Patent: *Jun. 17, 2014

(54) VIRTUAL STORAGE MIRROR CONFIGURATION IN VIRTUAL HOST

(71) Applicant: International Business Machines Corporation, Armonk, NY (US)

(72) Inventors: Jun Feng Liu, Beijing (CN); Jian Long Yang, Beijing (CN); Jin Xin Ying, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,105

(22) Filed: Feb. 4, 2013

(65) Prior Publication Data

US 2013/0145118 A1 Jun. 6, 2013

Related U.S. Application Data

(63) Continuation of application No. 13/359,570, filed on Jan. 27, 2012.

(30) Foreign Application Priority Data

Jan. 28, 2011 (CN) .......................... 2011 1 0032096

(51) Int. Cl.
*G06F 12/00* (2006.01)

(52) U.S. Cl.
USPC .......................................... 711/114; 711/162

(58) Field of Classification Search
USPC .................................................. 711/114, 162
See application file for complete search history.

(56) References Cited

U.S. PATENT DOCUMENTS

| | | | |
|---|---|---|---|
| 6,098,119 A | 8/2000 | Surugucchi et al. ............ 710/10 |
| 6,112,257 A | 8/2000 | Mason, Jr. et al. .............. 710/18 |
| 7,242,682 B1 * | 7/2007 | Mueggenberg et al. ...... 370/389 |
| 7,519,851 B2 | 4/2009 | Kitamura ..................... 714/6.23 |
| 2003/0212868 A1 * | 11/2003 | Alfieri et al. .................. 711/154 |
| 2005/0108375 A1 | 5/2005 | Hallak-Stamler ............. 709/223 |
| 2006/0161808 A1 | 7/2006 | Burkey ........................ 714/6.12 |
| 2007/0140236 A1 * | 6/2007 | Parthasarathy et al. ........ 370/389 |
| 2008/0294773 A1 | 11/2008 | Pafumi et al. ................. 709/225 |

* cited by examiner

*Primary Examiner* — Hashem Farrokh

(74) *Attorney, Agent, or Firm* — VanLeeuwen & VanLeeuwen; Parashos T. Kalaitzis

(57) ABSTRACT

A method for configuring mirrors of virtual storage devices in a virtual host includes obtaining a topology connection relationship between the virtual storage devices to be configured with mirrors and the virtual host, where the topology connection relationship is a hierarchical relationship in a tree shape with the virtual host as a root node and the virtual storage devices to be configured with mirrors as leaf nodes, and configuring the mirrors of the virtual storage devices to be configured with mirrors in the virtual host according to the obtained topology connection relationship. The method and the system for configuring mirrors of virtual storage devices in a virtual host can increase reliability.

7 Claims, 10 Drawing Sheets

VIRTUAL STORAGE MIRROR CONFIGURATION IN VIRTUAL HOST

BACKGROUND

The invention relates to virtual storage systems, and more particularly, to configuring virtual storage mirrors in virtual hosts.

An important technology of storage systems is the mirror technology. The mirror technology of storage devices causes two storage devices mirrored with each other to store two copies of data, so that although only one virtual disk can be seen from a host side, a backend manages two virtual disks mirrored with each other which are the backups of each other, thereby increasing the availability and reliability of data storage. The drawback is that the necessary storage space is twice the actual available storage space, and it also has a higher cost. In general physical storage technology, a system manager can easily set which storage disks are mirrored with each other according to actual physical virtual disks.

Virtual storage collectively manages a plurality of storage devices (such as hard disk, RAID) in a certain manner, so that all the storage devices are commonly managed in one storage pool, and under a virtual host. Regardless of the background storage device, what is seen from the virtual host side is a logical mirror of its familiar storage device, which can be considered as a virtual disk label such as hard disk A, and hard disk B. The virtual host may process all the virtual storage devices, i.e., virtual disks, in the same manner with actual physical disk storages. Even if the physical storages vary, such logical mirrors will not vary, and the system manager does not need to worry about the background storages, but only needs to focus on managing the storage spaces. This technology makes the storage management operations, such as system upgrading, establishing and allocating virtual disks, changing RAID level, expanding storage space and so on, easier than before, so that the storage management becomes convenient and easy.

In the virtual storage, the mirror technology of a virtual storage is also included. Typically, the implementations of mirror technology of a virtual storage include two types: the mirror instructed by hardware structure and the mirror instructed by software structure. In the virtual storages of the mirrors instructed by the software structure, actual background physical storage devices may be very complicated, so the system manager usually uses an operating system on the virtual host or an interface provided by mirror dedicated software to instruct the mirrors, so that there is a mirror relationship between a plurality of virtual storage devices managed by the virtual host. Normally, the system manager enters a mirror command, and the operating system on the virtual host or the mirror dedicated software directly specifies the mirror relationship according to the sizes of the virtual storage device spaces. Since the virtual environment shields the correspondence between the virtual storage devices and the physical disks and the storage pools, there is a reliability problem in the mirrors specified by the mirror dedicated software.

SUMMARY

In order to solve the problems in the art, the invention proposes a method and a system for configuring Mirrors of virtual storage devices in the above virtual host.

According to an embodiment of the invention, a method is provided for configuring mirrors of virtual storage devices in a virtual host, including obtaining a topology connection relationship between a plurality of virtual storage devices to be configured with one or more mirrors and the virtual host, where the topology connection relationship is a hierarchical relationship in a tree shape with the virtual host as a root node and the virtual storage devices to be configured with mirrors as leaf nodes, and configuring the mirrors of the virtual storage devices to be configured with mirrors in the virtual host according to the obtained topology connection relationship.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Embodiments of the invention will be described in more details with reference to the drawings in which the embodiments of the invention are illustrated. However, the invention can be implemented in various forms, and should not be understood as limited by the embodiments disclosed herein. Instead, providing these embodiments makes the invention more apparent to the person skilled in the art.

Figure 1:
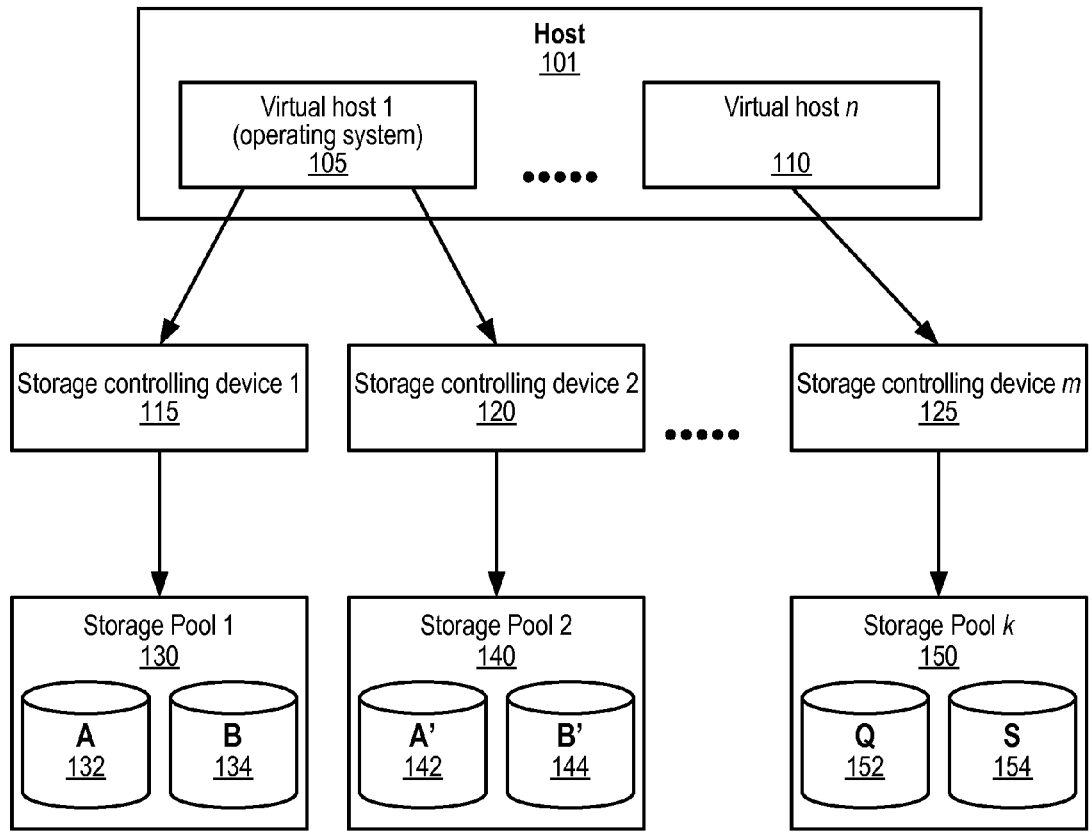
FIG. 1 shows a schematic view of an existing virtual storage system mirror configuration.

FIG. 1 shows a schematic view of an existing virtual storage system mirror configuration. According to FIG. 1, a physical host 101 may be virtualized into several virtual hosts, such as virtual host 1 105, . . . , virtual host n 110, each of which controls virtual storage devices (such as virtual storage devices 132, 134, 142, 144, 152, and 154) in storage pools (such as storage pools 130, 140, and 150) through storage controlling devices (such as storage controlling devices 115, 120, and 125). For example, a virtual host n 110 controls a virtual controlling device m 125 through its operating system, the virtual controlling device m 125 controls a storage pool k 150, and the storage pool k 150 includes two virtual storage devices, a virtual disk Q 152 and a virtual disk S 154, wherein the Q and the S are virtual disk labels. By taking the virtual host 1 105 as an example, assume that the virtual host 1 105 controls a storage controlling device 1 115 through the operating system, and the storage controlling device 1 115 controls storage pools 1 130 and storage pool 2 140, the storage pool 1 130 includes a virtual disk A 132 and a virtual disk B 134, and the storage pool 2 140 includes a virtual disk A' 142 and a virtual disk B' 144, wherein the A, B, A' and B' are virtual disk labels. In the invention, the virtual disk label represents the virtual storage device. Assuming that the sizes of the four virtual disks are equal, in such a virtual storage system, then which storage pool the virtual disks pertain to is configured by the system manager through an operating system configuring tool of the virtual host 105. In the existing operating system configuring tool, if the operating system further configures the virtual storage system to support the mirror storages, the virtual host operating system randomly selects any two of the four virtual disks to be mirrored with each other. When instructing to allocate mirrors, the only factor cared about by the virtual host operating system is the storage space sizes of the virtual storage devices, i.e., the storage space sizes of the two virtual storage devices mirrored with each other have to be equal. In other words, as long as the storage space sizes of the two virtual storage devices are equal, the host can specify them as a mirror pair, and the two virtual storage devices can be mirrored with each other. The operating system does not care about which storage pool these virtual disks pertain to, so it is possible that two virtual disks in the same storage pool are mirrored with each other, for example, in FIG. 1, if during the process of the system for automatically allocating mirrors, the virtual disks A and B are mirrored with each other, and then the virtual disks A' and B' are mirrored with each other. Thus, if any problem occurs in the storage controlling device 1 115, the virtual disks A 132 and B 134 both can not be accessed by the virtual host 1 105, thereby greatly decreasing the reliability of the system.

The person skilled in the art can note that: in FIG. 1, if the virtual disks A 132 and A' 142 and the virtual disks B 134 and B' 144 are mirrored with each other, or the virtual disks A 132 and B' 144 and the virtual disks A' 142 and B 134 are mirrored with each other, there is no problem as described above.

Thus, the present invention proposes that when the mirror pair of the storage devices is set according to the manager's requirement in the virtual host, it is necessary to consider the topology connection relationship between the virtual storage devices and the virtual host in the virtual storage system, and select an appropriate virtual storage device pair as mirrors, according to the topology connection relationship between the virtual storage devices and the virtual host, so that when establishing mirrors, the above problem can be effectively avoided. Herein, the virtual storage device is typically the virtual storage device specified by the virtual disk label, and the corresponding physical storage device can vary, for example, including storage array, magnetic disk, magnetic tape, and so on.

Figure 2:
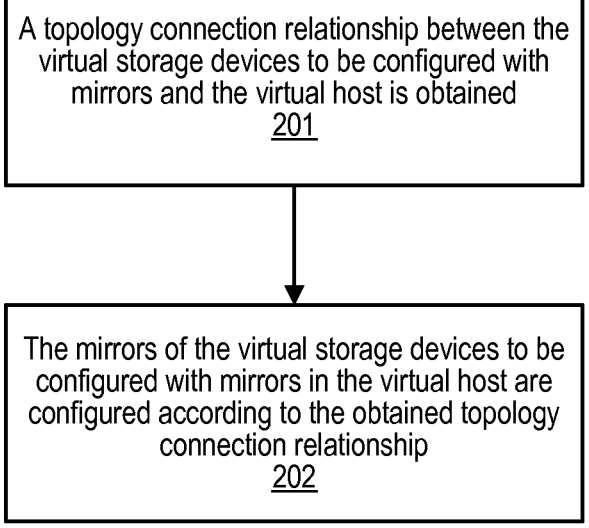
FIG. 2 shows an embodiment of a method for configuring virtual storage mirrors in a virtual host.
Figure 3:
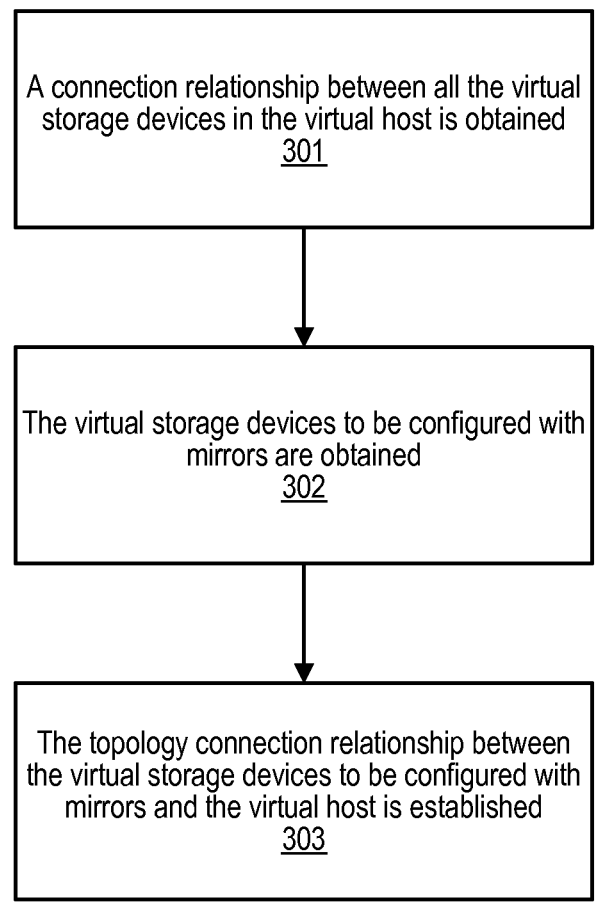
FIG. 3 shows an embodiment for obtaining a topology connection relationship between virtual storage devices to be configured with mirrors in a virtual host.

FIG. 2 shows an embodiment of a method for configuring virtual storage mirrors in a virtual host. According to FIG. 2, in step 201, a topology connection relationship between the virtual storage devices to be configured with mirrors and the virtual host to be configured with mirrors is obtained, in which the topology connection relationship is a hierarchical relationship in a tree shape, with the virtual host as a root node and the virtual storage devices as leaf nodes. Then, in step 202, the mirrors of the virtual storage devices to be configured with mirrors in the virtual host are configured according to the obtained topology connection relationship. Steps 201 and 202 are described in further detail below For the topology connection relationship between the virtual storage devices to be configured with mirrors and the virtual host, many embodiments can be used. FIG. 3 shows one embodiment. According to FIG. 3, in step 301, a connection relationship between the virtual storage devices in the virtual host is obtained. In step 302, the virtual storage devices to be configured with mirrors are obtained. In step 303, the topology connection relationship between the virtual storage devices to be configured with mirrors and the virtual host is established.

With respect to the step 301, in an existing system, the virtual host, the storage controlling devices, and the storage pools all provide interfaces based on systematical management, such as API, command line, or CI and SNMP interfaces that comply with industry standards. The connection relationship between the virtual storage devices in the virtual host can be constructed from information collected through these systematical management interfaces. Below, is an example of how to obtain the connection relationship between the storage devices, explained using IBM VIOS system command line manner as an example.

A command lssyscfg can list all the virtual storage controlling devices:

⟩ lssyscfg -r lpar|grep vioserver (entering commands in the command lines)

A command lssp can list all the available storage pools managed by a certain storage controlling device, and herein, a default storage pool rootvg is concerned:

⟩ lssp (entering commands in the command lines)

The output of the command line is:

| Pool | Size(mb) | Free(mb) | Alloc Size(mb) | BDs Type |
|---|---|---|---|---|
| rootvg | 35776 | 3904 | 64 | 3 LVPOOL |

In addition, related storage partition information on the storage pools can be requested. Herein, a logical partition lv00 is included in the storage pools, and the logical partition lv00 is considered as a virtual storage device, but the virtual host side mainly uses the disk label of the virtual storage device to recognize the virtual storage device. In one embodiment, the virtual disk label represents the virtual storage device, so the disk label corresponding to the logical partition, i.e., the virtual storage device, needs to be obtained.

In the below commands, logical partitions are associated with the virtual host through a Virtual Target Device (VTD) and a Server Virtual SCSI Adaptor (SVSA). The output knows that the server virtual SCSI adaptor is vhost3:

| $ lssp -bd -sp rootvg | | |
|---|---|---|
| Name | Size(mb) VTD | SVSA |
| lv00 | 5120 vtscsi0 | vhost3 |

The command lsmap further provides a mapping relationship between the virtual host and the virtual disks, and the parameter vadapter indicates the mapping of the server virtual SCSI adaptor vhost3 to be inquired. From the output, the virtual disk lv00 is assigned to the virtual host with ID of 0x00000013 as follows:

| $ lsmap -vadapter vhost3 | | |
|---|---|---|
| SVSA | Physloc | Client Partition ID |

-continued

```
vhost3          U9406.675.107074C-V16-C16         0x00000013
VTD             vtscsi0
Status          Available
LUN             0x8200000000000000
Backing device  lv00
Physloc
Mirrored        N/A
```

The virtual disk configuration information is requested on the virtual host 0x00000013 (herein, the virtual host is an AIX system). The output knows the disk label hdisk1 is mapped into the virtual disk lv00, as follows:

```
$lscfg -vp | grep hdisk
..................
    hdisk1 U9406.675.107074C-V16-C16-T1-L8200000000000000
    Virtual
SCSI Disk Drive (5120MB)
    ......................
```

Figure 4:
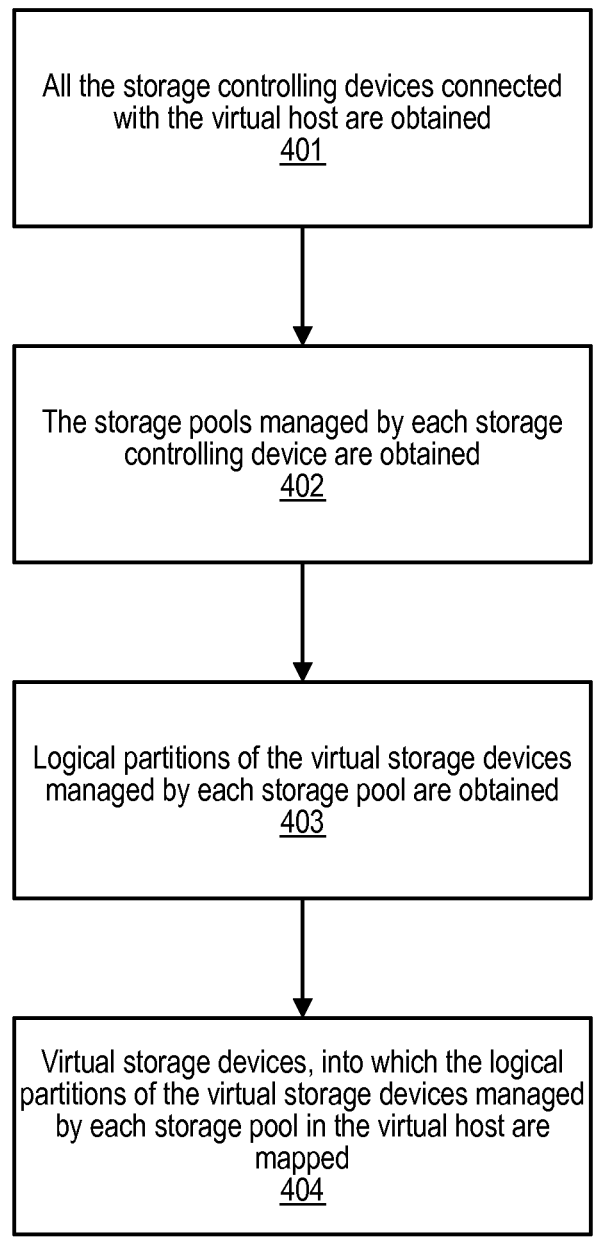
FIG. 4 shows a method for obtaining a connection relationship between all virtual storage devices in a virtual host according to one embodiment of the invention.

Thus, it is preferable that the connection relationship between all the virtual storage devices in the virtual host is obtained through a system management interface, such as API, command line or CIM, or SNMP interfaces complying with an industry standard. This can be realized, since a normal system manager knows all the devices and their IPs managed by the system, and even if the system manager doesn't know, the system manager also may obtain the information through a management tool, such as by using a broadcast or a pipeline tool to check all the hardware devices. Thus, the steps of the method illustrating one embodiment for obtaining the connection relationship between all the virtual storage devices are summarized by using FIG. 4. According to FIG. 4, in step 401, all the storage controlling devices connected with the virtual host are obtained. In step 402, the storage pools managed by each storage controlling device are obtained. In step 403, logical partitions of the virtual storage devices managed by each storage pool are obtained. In step 404, virtual storage devices, into which the logical partitions of the virtual storage devices managed by each storage pool in the virtual host are mapped, i.e., the disk label of the virtual storage device, are obtained.

Figure 5A:
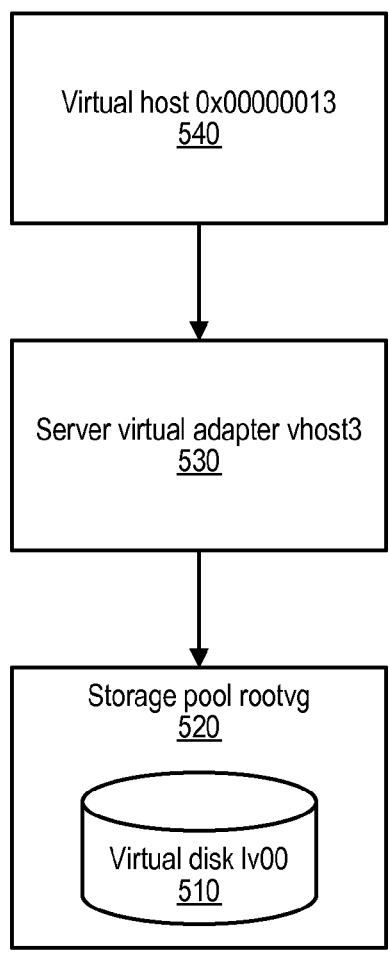
FIG. 5a and FIG. 5b show a usage structure and a topology connection relationship represented by a tree in an exemplary IBM VIOS system command line manner.
Figure 5B:
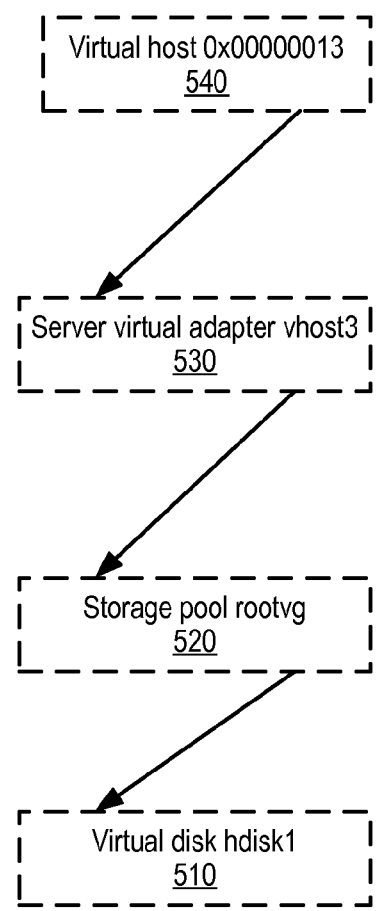

The example of the virtual storage pool, the topology relationship between the storage controlling devices and the virtual host, and the topology connection relationship represented by the structure and the tree are shown in FIG. 5a and FIG. 5b. The connection relationship indicates the connection relationship between the storage devices in the virtual host. The topology connection relationship between the virtual storage device and the virtual host is a hierarchical relationship in a tree shape with the virtual host as a root node, and the virtual storage devices as leaf nodes. Assuming for the exemplary IBM VIOS system command line manner, if the virtual storage devices to be configured with mirrors only include the virtual disk lv00 510, the topology connection relationship between the virtual storage devices to be configured with mirrors in the virtual host is directly established, so the virtual host 0x00000013 540 manages the storage pool rootvg 520 through the server virtual SCSI adaptor vhost3 530. The storage pool rootvg 520 includes the virtual disk of the virtual disk lv00 (the disk label of which is hdisk1).

If the obtained connection relationship between all the virtual storage devices includes some additional devices, for example, some virtual storage devices in the storage pool do not pertain to the virtual storage devices to be configured with mirrors, the connection relationship between all the virtual storage devices in the virtual host can be cut down, to establish the topology connection relationship between the virtual storage devices to be configured with mirrors and the virtual host.

For the virtual storage devices to be configured with mirrors, generally, the system manager specifies the virtual storage devices to be configured with mirrors, or notifies the system of which virtual storage devices are configured with mirrors by the application program interface of the software. Since the storage spaces of the two virtual disks mirrored with each other are preferably equal, the system usually assigns the mirrors to a group of virtual storage devices with equal storage space sizes. Thus, the system needs to group the virtual storage devices with equal storage space sizes in the virtual storage devices to be configured with mirrors, so as to configure the mirrors among the group of virtual storage devices with equal storage space sizes. For each such group, it is determined whether the number of the group of virtual storage devices is even, and if not, one virtual storage device with the same storage space as one virtual storage device of the group is added into the group. Note that in many cases, the system manager directly organizes all the virtual storage devices into storage spaces with equal sizes, so the grouping is not necessary. Different operating systems may use many different grouping methods. In addition, determining whether the number of the virtual storage devices in a group is even can be realized by issuing a command. First, it is checked whether the number of the storage devices is even, and if not, a prompt occurs requesting adding more virtual disks. Typically, the system manager knows the above requirement, so this step is typically an optional step.

In addition, if the virtual storage devices to be configured with mirrors have been grouped into a plurality of groups, then obtaining the topology connection relationship between the virtual storage devices to be configured with mirrors and the virtual host includes obtaining the topology connection relationship between each group of virtual storage devices to be configured with mirrors and the virtual host. That is, the topology connection relationship between the virtual storage devices to be configured with mirrors and the virtual host includes a plurality of topology connection relationships, wherein, one of the plurality of topology connection relationships represents the topology connection relationship between the virtual storage devices of one of the plurality of groups to be configured with mirrors and the virtual host. Thus, when configuring the mirrors, the mirrors are configured among the plurality of virtual storage devices inside each virtual storage device group.

Figure 6:
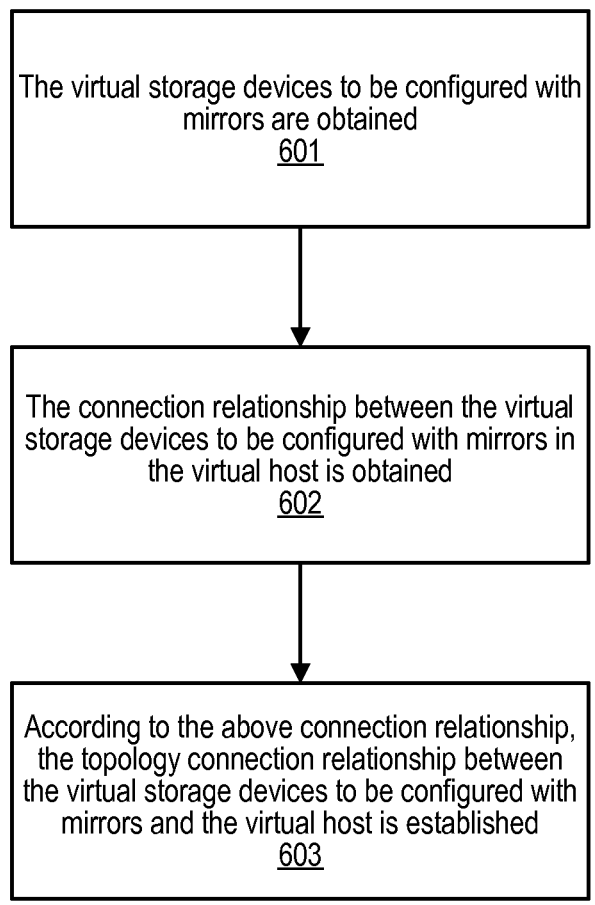
FIG. 6 shows another embodiment for obtaining a topology connection relationship between virtual storage devices to be configured with mirrors in a virtual host.

FIG. 6 shows another embodiment for obtaining a topology connection relationship between virtual storage devices to be configured with mirrors in a virtual host. According to FIG. 6, in step 601, the virtual storage devices to be configured with mirrors are obtained. In step 602, the connection relationship between the virtual storage devices to be configured with mirrors in the virtual host is obtained. In step 603, according to the above connection relationship, the topology connection relationship between the virtual storage devices to be configured with mirrors and the virtual host is established.

Figure 7:
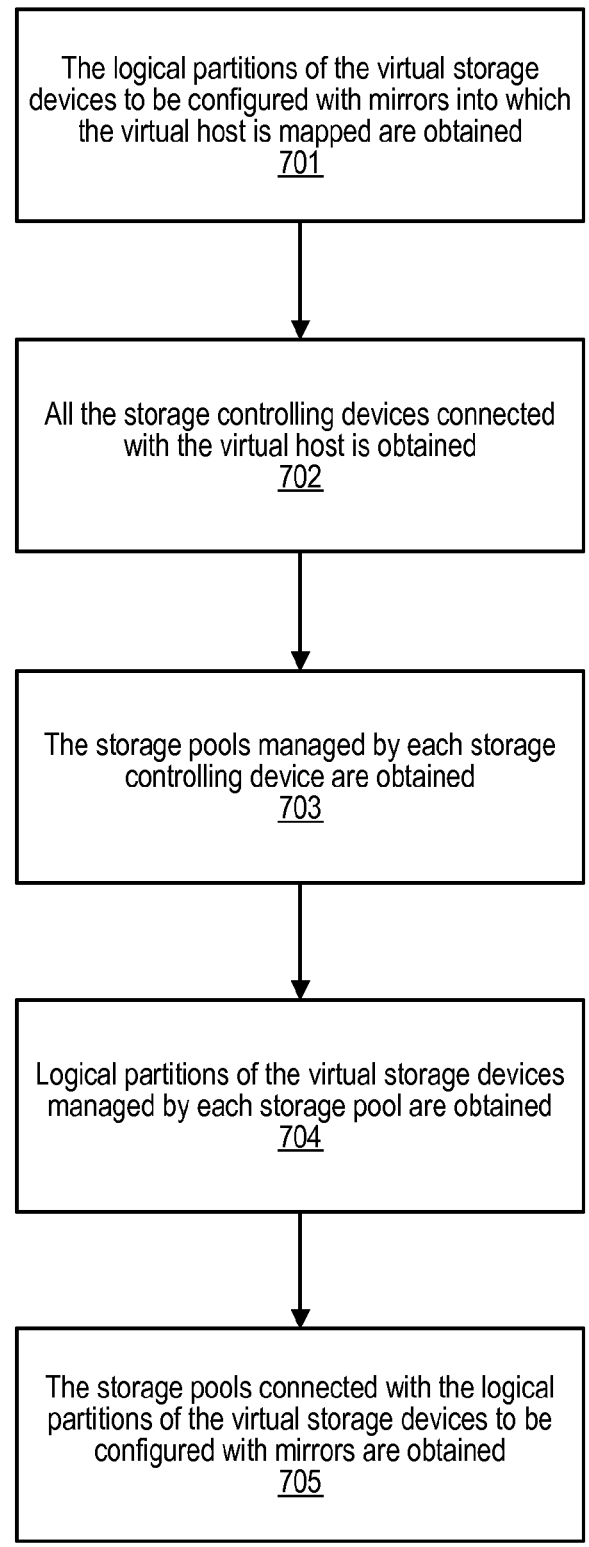
FIG. 7 shows another embodiment for obtaining a topology connection relationship between virtual storage devices to be configured with mirrors in a virtual host.

In the embodiment shown in FIG. 6, the manner for obtaining the virtual storage devices to be configured with mirrors is the same as the manner used in FIG. 3, in particular, considering problems such as the grouping and the number of the virtual storage devices in the group. In an embodiment of step 602, the manner for obtaining the connection relationship between all the virtual storage devices in the virtual host in FIG. 4 can be fully utilized to obtain the connection relationship between the virtual storage devices to be configured with mirrors in the virtual host in various manners. FIG. 7 shows another embodiment. According to FIG. 7, in step 701, the logical partitions of the virtual storage devices to be configured with mirrors into which the virtual host is mapped are obtained. In step 702, all the storage controlling devices connected with the virtual host are obtained. In step 703, the storage pools managed by each storage controlling device are obtained. In step 704, the logical partitions of the virtual storage devices managed by each storage pool are obtained. In step 705, the storage pools connected with the logical partitions of the virtual storage devices to be configured with mirrors are obtained.

After obtaining the topology connection relationship between the virtual storage devices to be configured with mirrors, various methods for configuring the mirrors of the virtual storage devices in the virtual host may be used. According to the example of FIG. 1, it is known that if the distance between the common father node of the virtual storage devices to be configured with mirrors and their mirrors configured in the virtual host and the root node in the obtained topology connection relationship is less than the distance between the node representing the storage pool and the root node, such mirrors are reliable.

Figure 8A:
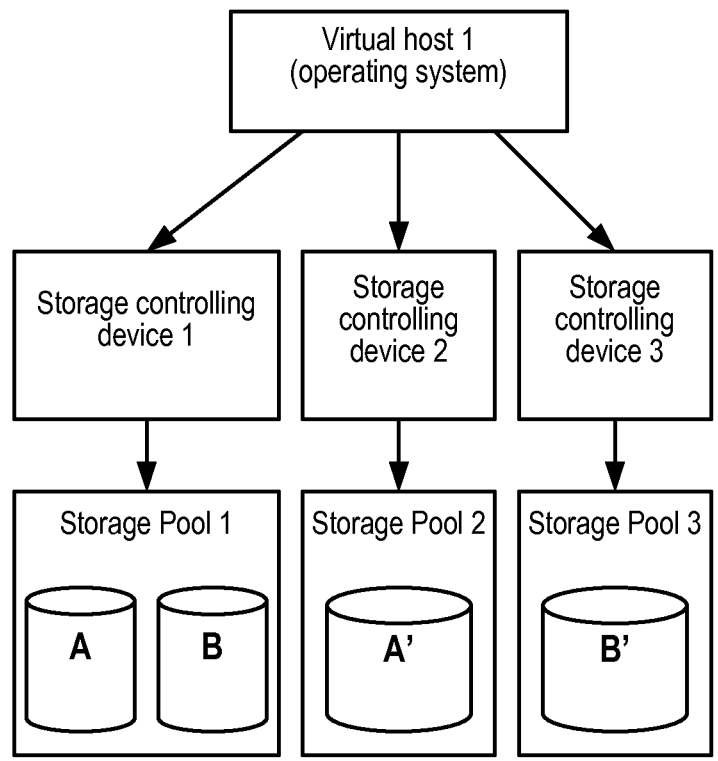
FIG. 8a and FIG. 8b show a structure and a tree representation of an exemplary obtained topology connection relationship in a virtual host.
Figure 8B:
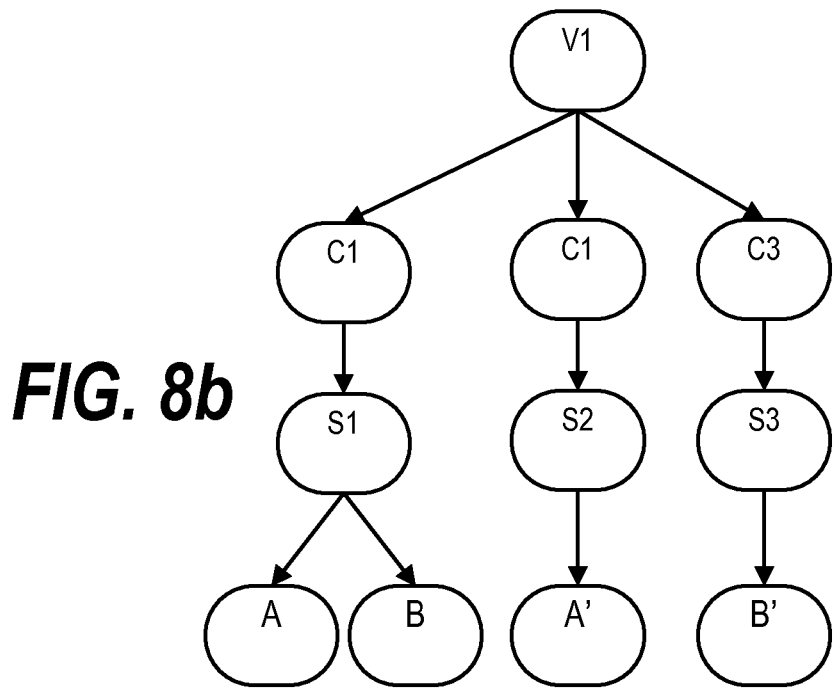
Figure 9:
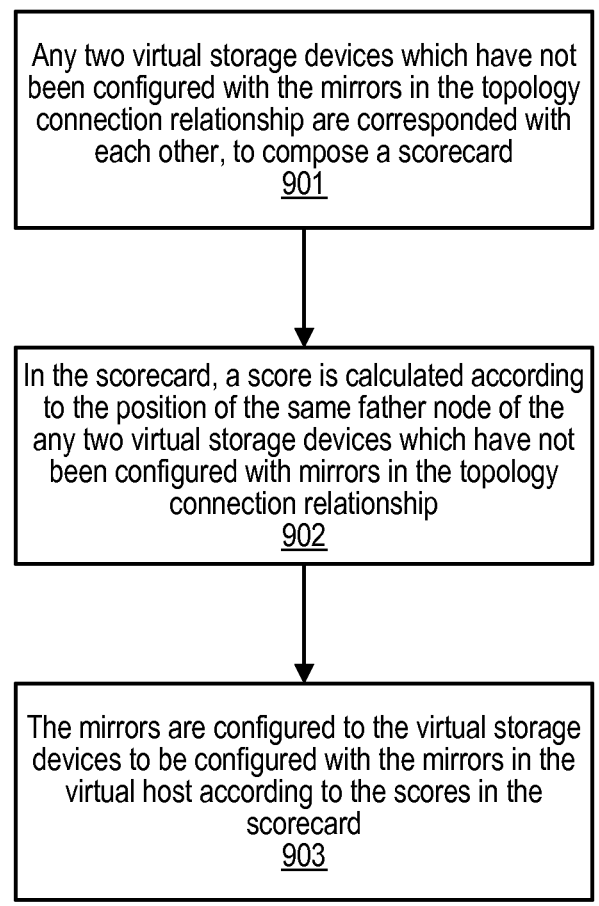
FIG. 9 shows steps for configuring mirrors of virtual storage devices in a virtual host in a scorecard manner according to one embodiment of the invention.

In one embodiment for obtaining the mirrors, a score card can be used to configure the mirror of one virtual storage device in the virtual host. Assume, for example, that the obtained structure and tree shape of the topology connection relationship in the virtual host is shown in FIG. 8a and FIG. 8b. FIG. 9 shows steps for configuring mirrors of virtual storage devices in a virtual host in a scorecard manner. In step 901, any two virtual storage devices which have not been configured with the mirrors in the topology connection relationship are corresponded with each other, to compose a scorecard. In step 902, in the scorecard, a score is calculated according to the position of the same father node of the any two virtual storage devices which have not been configured with mirrors in the topology connection relationship. In step 903, the mirrors are configured to the virtual storage devices to be configured with the mirrors in the virtual host according to the scores in the scorecard.

Figure 10:
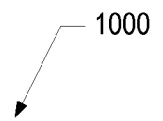
FIG. 10 shows an exemplary scorecard established by virtual storage devices to be configured with Mirrors in FIGS. 8a and 8b.

In particular, the virtual storage devices for establishing mirrors as shown in FIGS. 8a and 8b establish one exemplary scorecard as shown in FIG. 10. For any two virtual storage devices, the scores are calculated according to the corresponding topology connection relationship of a tree shape. Assuming that the tree structure has n layers, such as 4 layers, as shown in FIG. 8, the calculating rule may be that: if the two virtual storage devices are located in the same storage pool (i.e., the same father node is at the $(n-1)^{th}$ layer), the score corresponding to the two is the lowest score, such as 0 in FIG. 10. If the two virtual storage devices are under the management of the same one virtual controlling device (i.e., the same father node is at the $(n-2)^{th}$ layer), the score corresponding to the two is the second lowest score, such as 2 in FIG. 10. If the two virtual storage devices are under the management of the same one virtual host (i.e., the same father node is at the $(n-3)^{th}$ layer), the score corresponding to the two is the third lowest score, such as 4 in FIG. 10, and so on. The scores for the case that any two virtual storage devices are mirrored with each other can be obtained. Two virtual storage devices with the highest score whose score is not the lowest score can be selected to be mirrored with each other. For example, according to the result of the scorecard in FIG. 10, the virtual disk A and A' and the virtual disk B and B' can be selected to be mirrored with each other, or the virtual disk A and B' and the virtual disk A' and B can be selected to be mirrored with each other. Herein, the configuring the two corresponding virtual storage devices with the highest score to be mirrored with each other is one embodiment, and the person skilled in the art will understand that different rules may be defined to perform the selection. For example, as the layer number of the same father node of two corresponding virtual storage devices in the topology connection relationship is higher, the score is lower, so that the two corresponding virtual storage devices with the lowest score are selected to be mirrored with each other, and so on.

In another embodiment for obtaining the mirrors of the virtual storage devices to be configured with mirrors in the virtual host according to the obtained topology connection relationship, for any one virtual storage device which has not been configured with a mirror in the topology connection relationship, in other virtual storage devices which have not been configured with mirrors in the topology connection relationship, virtual storage devices which have the same father node as the any one virtual storage device and whose father node is not the storage pool is obtained; the virtual storage device located at the highest node in the topology connection relationship in the obtained virtual storage devices which have the same father node as the any one virtual storage device and whose father node is not the storage pool is configured to be the mirror of the any one virtual storage device. If there is no virtual storage device which has the same father node as the any one virtual storage device and whose father node is not the storage pool, it is prompted that the any one virtual storage device can not be configured with a mirror in the virtual host. This embodiment can reduce the calculation amount compared with the above scorecard manner, and although the configured mirror is available, the mirror configured by the scorecard manner is typically preferred.

Under the same inventive concept, the invention further discloses a system for configuring mirrors of virtual storage devices in a virtual host, the system including: means configured to obtain a topology connection relationship between the virtual storage devices to be configured with mirrors and the virtual host, in which, the topology connection relationship is a hierarchical relationship in a tree shape with the virtual host as a root node and the virtual storage devices as leaf nodes; and means configured to configure the mirrors of the virtual storage devices to be configured with mirrors in the virtual host according to the obtained topology connection relationship. This embodiment of the system is consistent with the above described method, and the implementations can be referred to the above description for the method, as described above.

In another embodiment of the system for configuring mirrors of virtual storage devices in a virtual host, the means configured to obtain a topology connection relationship between the virtual storage devices to be configured with mirrors and the virtual host includes: means configured to obtain the connection relationship between all the virtual storage devices in the virtual host; means configured to obtain the virtual storage devices to be configured with mirrors; and means configured to establish the topology connection relationship between the virtual storage devices to be configured with Mirrors and the virtual host. In one embodiment, the means configured to obtain the connection relationship between all the virtual storage devices in the virtual host includes: means configured to obtain all the storage controlling devices connected with the virtual host; means configured to obtain the storage pool managed by each storage controlling device; means configured to obtain logical partitions of the virtual storage devices managed by each storage pool; and means configured to obtain virtual storage devices, into which the logical partitions of the virtual storage devices managed by each storage pool in the virtual host are mapped.

In another embodiment of the system for configuring mirrors of virtual storage devices in a virtual host, the means configured to obtain a topology connection relationship between the virtual storage devices to be configured with mirrors and the virtual host includes: means configured to obtain the virtual storage devices to be configured with mirrors; means configured to obtain the connection relationship between the virtual storage devices to be configured with mirrors in the virtual host; and means configured to establish the topology connection relationship between the virtual storage devices to be configured with mirrors and the virtual host. In an embodiment, the means configured to obtain the connection relationship between the virtual storage devices to be configured with mirrors in the virtual host includes: means configured to obtain logical partitions of virtual storage devices to be configured with mirrors, into which the virtual host is mapped; means configured to obtain all the storage controlling devices connected with the virtual host; means configured to obtain storage pools managed by each storage controlling device; means configured to obtain the logical partitions of the virtual storage devices managed by each storage pool; and means configured to obtain the storage pools associated with the logical partitions of the virtual storage devices to be configured with mirrors.

In the above embodiments of the system for configuring mirrors of virtual storage devices in a virtual host, the means configured to obtain the virtual storage devices to be configured with mirrors may further include: means configured to group the virtual storage devices with equal storage space sizes in the virtual storage devices to be configured with mirrors, into a group; and means for, for the virtual storage devices in each group, determining whether the number of the group of virtual storage devices is even, and if not, prompting that one virtual storage device with the same storage space as one virtual storage device of the group is to be added into the group. Further, if the virtual storage devices to be configured with mirrors have been grouped into a plurality of groups, the means configured to obtain the topology connection relationship between the virtual storage devices to be configured with mirrors and the virtual host includes means configured to obtain the topology connection relationship between each group of virtual storage devices to be configured withmMirrors and the virtual host. That is, the topology connection relationship between the virtual storage devices to be configured with mirrors and the virtual host includes a plurality of topology connection relationships, wherein, one of the plurality of topology connection relationships presents the topology connection relationship between one group of the plurality of groups of virtual storage devices and the virtual host.

The means configured to configure the mirrors of the virtual storage devices to be configured with mirrors in the virtual host according to the obtained topology connection relationship may have various embodiments. According to the example in FIG. 1, it can be known that only if the distance between the common father node of the virtual storage devices to be configured with mirrors and their mirrors configured in the virtual host and the root node in the obtained topology connection relationship is less than the distance between the node representing the storage pool and the root node, such mirrors are reliable. In an embodiment for obtaining the mirrors, the means includes: means configured to correspond any two virtual storage devices which have not been configured with the mirrors in the topology connection relationship with each other, to compose a scorecard; means configured to in the scorecard, calculate a score according to the position of the same father node of the any two virtual storage devices which have not been configured with mirrors in the topology connection relationship; and means configured to configure the mirrors to the virtual storage devices to be configured with the mirrors in the virtual host according to the scores in the scorecard.

In another embodiment, the means includes: means for, for any one virtual storage device which has not been configured with a mirror in the topology connection relationship, in other virtual storage devices which have not been configured with mirrors in the topology connection relationship, obtaining virtual storage devices which have the same father node as the any one virtual storage device and whose father node is not the storage pool; and means configured to configure the virtual storage device located at the highest node in the topology connection relationship in the obtained virtual storage devices which have the same father node as the any one virtual storage device and whose father node is not the storage pool to be the mirror of the any one virtual storage device. Herein, if there is no virtual storage device which has the same father node as the any one virtual storage device and whose father node is not the storage pool, it is prompted that the any one virtual storage device can not be configured with a mirror in the virtual host.

Although the exemplary embodiments of the invention are described here with reference to the drawings, it should be understood that the invention is not limited to these precise embodiments, and the person skilled in the art may make various modifications to the embodiments without departing from the scope and the principle of the invention. All these variations and modifications are intended to be contained in the scope of the invention defined by the appended claims.

The invention claimed is:

1. A method for configuring mirrors of virtual storage devices in a virtual host, comprising:
   obtaining a topology connection relationship between a plurality of virtual storage devices to be configured with one or more mirrors and the virtual host, wherein the topology connection relationship is a hierarchical relationship in a tree shape with the virtual host as a root node and the virtual storage devices to be configured with mirrors as leaf nodes; and
   configuring the mirrors of the virtual storage devices to be configured with mirrors in the virtual host according to the obtained topology connection relationship.

2. The method according to claim 1, further comprising:
   grouping one or more of virtual storage devices with equal storage space sizes in the virtual storage devices to be configured with mirrors, into a group;
   determining whether a number of the group of virtual storage devices is even; and
   in response to determining that the number is not even, prompting for an additional virtual storage device with the same storage space as one virtual storage device of the group to be added into the group.

3. The method according to claim 2, wherein the grouping comprises grouping the virtual storage devices to be configured with mirrors into a plurality of groups, and wherein obtaining the topology connection relationship between the virtual storage devices to be configured with mirrors and the virtual host includes obtaining the topology connection relationship between each group of virtual storage devices to be configured with mirrors and the virtual host.

4. The method according to claim 1, wherein the distance between a common father of a first virtual storage device to be configured with mirrors and a corresponding mirror configured in the virtual host node and the root node in the obtained topology connection relationship is less than the distance between a node representing a storage pool and the root node.

5. The method according to claim 4, wherein the configuring further comprises:
- corresponding any two virtual storage devices which have not been configured with the mirrors in the topology connection relationship with each other, to compose a scorecard;
- in the scorecard, calculating a score according to a position of a same father node of the any two virtual storage devices which have not been configured with mirrors in the topology connection relationship; and
- configuring the mirrors to the virtual storage devices to be configured with the mirrors in the virtual host according to the scores in the scorecard.

6. The method according to claim 4, wherein the obtaining further comprises:
- for a first virtual storage device which has not been configured with a mirror in the topology connection relationship, selecting, from the other virtual storage devices which have not been configured with mirrors in the topology connection relationship, one or more virtual storage devices which have a same father node as the first virtual storage device and whose father node is not the storage pool; and
- configuring the virtual storage device located at the highest node in the topology connection relationship in the one or more selected virtual storage devices which have the same father node as the first virtual storage device and whose father node is not the storage pool to be the mirror of the first virtual storage device.

7. The method according to claim 6, wherein, if there is no virtual storage device which has the same father node as the first virtual storage device and whose father node is not the storage pool, prompting that the first virtual storage device can not be configured with a mirror in the virtual host.

* * * * *